(12) United States Patent
Vuppala et al.

(10) Patent No.: US 12,299,477 B2
(45) Date of Patent: May 13, 2025

(54) SYSTEMS AND METHODS FOR DETERMINING DATA MIGRATION USING AN AUTOMATED QUERY ANALYZER TOOL

(71) Applicant: BANK OF AMERICA CORPORATION, Charlotte, NC (US)

(72) Inventors: Hari Vuppala, Concord, NC (US); Rahul Shashidhar Phadnis, Charlotte, NC (US); Pratap Dande, Saint Johns, FL (US); Sailesh Vezzu, Hillsborough, NJ (US); Amer Ali, Jersey City, NJ (US); Rahul Yaksh, Austin, TX (US); Elvis Nyamwange, Little Elm, TX (US); Brian Neal Jacobson, Los Angeles, CA (US); Erik Dahl, Newark, DE (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 18/237,257

(22) Filed: Aug. 23, 2023

(65) Prior Publication Data

US 2025/0068461 A1 Feb. 27, 2025

(51) Int. Cl.
  *G06F 17/00* (2019.01)
  *G06F 9/48* (2006.01)
  *G06F 16/2457* (2019.01)

(52) U.S. Cl.
  CPC ........ *G06F 9/485* (2013.01); *G06F 16/24575* (2019.01)

(58) Field of Classification Search
  CPC .......................... G06F 16/24575; G06F 9/485
  See application file for complete search history.

(56) References Cited

U.S. PATENT DOCUMENTS

| | | | |
|---|---|---|---|
| 7,991,893 B2 | 8/2011 | Kudo |
| 8,285,849 B2 | 10/2012 | Oeda |
| 8,533,415 B2 | 9/2013 | Suzuki |

(Continued)

FOREIGN PATENT DOCUMENTS

| | | | |
|---|---|---|---|
| AU | 2015256010 A1 | 11/2016 |
| AU | 2019340314 A1 | 8/2020 |
| CN | 112153098 A | 12/2020 |

*Primary Examiner* — Greta L Robinson
(74) *Attorney, Agent, or Firm* — Moore & Van Allen PLLC; Lauren M. Stokes

(57) ABSTRACT

Systems, computer program products, and methods are described herein for determining data migration using an automated query analyzer tool. The present disclosure is configured to identify at least one input data set associated with at least one application; analyze, by an automated query analyzer tool, the at least one input data set; classify data of the at least one data set as at least one of a standard classification or a non-standard classification; determine at least one metric for the data of the at least one data set; generate a query complexity score for the at least one application; generate an application migration complexity report and an application migration complexity report interface component; and transmit the application migration complexity report interface component to a user device and configure a graphical user interface of the user device with the application migration complexity report interface component.

20 Claims, 12 Drawing Sheets

(56) References Cited

U.S. PATENT DOCUMENTS

| | | |
|---|---|---|
| 8,875,160 B2 | 10/2014 | Hunt |
| 8,914,789 B2 | 12/2014 | Barros |
| 9,461,969 B2 | 10/2016 | Watt |
| 9,594,590 B2 | 3/2017 | Hsu |
| 9,648,134 B2 | 5/2017 | Frank |
| 9,686,281 B2 | 6/2017 | Bulusu |
| 9,971,622 B2 | 5/2018 | Bjorkengren |
| 10,135,749 B2 * | 11/2018 | Soni .................... G06F 11/3003 |
| 10,489,344 B1 * | 11/2019 | Shaw .................... G06F 16/119 |
| 10,555,146 B2 | 2/2020 | Zhu |
| 10,594,789 B2 | 3/2020 | Bai |
| 10,684,999 B2 * | 6/2020 | Mayer .................... G06F 16/214 |
| 11,153,394 B1 * | 10/2021 | Eberlein ................ H04L 67/61 |
| 11,483,384 B2 | 10/2022 | Ranjan |
| 11,582,165 B1 | 2/2023 | Suit |
| 11,797,395 B2 | 10/2023 | Wang |
| 2018/0191599 A1 | 7/2018 | Balasubramanian |
| 2020/0409904 A1 * | 12/2020 | Jha ........................ G06F 16/119 |
| 2021/0028981 A1 | 1/2021 | Subramanian |

\* cited by examiner

STEPS:
1. CALCULATE QUERY COMPLEXITY SCORE
2. ADD QUERY COMPLEXITY SCORES BY METHOD AND APPLY METHOD COMPLEXITY FACTOR
3. SCORE THE APPLICATIONS FOR EFFORT ON A SCALE OF 10

| | QUERY COMPLEXITY SCORE | | |
|---|---|---|---|
| | LOW | MEDIUM | HIGH |
| | 1 TO 3 | 4 TO 8 | 9+ |
| NUMBER OF JOINS | 1 TO 3 | 4 TO 8 | 9+ |
| NUMBER OF SUBQUERIES | 1 TO 3 | 4 TO 8 | 9+ |
| UPDATE | | X | |
| TD SPECIFIC FUNCTIONS/CLAUSES | | | |
| SAMPLE QUERIES THAT CONTAIN BELOW TERMS | | | |
| FUNCTIONS | | | |
| MSUM | | | |
| CSUM | | | |
| OREPLACE | | | |
| OTRANSLATE | | | |
| REGEX | | | |
| CASE_N | | | |
| RANGE_N | | | |
| ZEROIFNULL | | | X |
| SAMPLE FEATURES/KEYWORDS/CLAUSES | | | |
| LOCKING | | | |
| ROLLBACK | | | |
| UPDATE FROM | | | |
| USING | | | |
| COMMIT | | | |
| QUALIFY | | | |
| BT/ET | | | |
| MERGE INTO | | | |
| VOLATILE TABLE | | | |
| WITH RECURSIVE | | | |

| | EXECUTION METHOD FACTOR | | |
|---|---|---|---|
| | LOW | MEDIUM | HIGH |
| | 100% | 120% | 160% |
| BTEQ | | | X |
| TPTUPD | | | X |
| SAS | | | X |
| TRUMP | | X | |
| MULTLOAD | | X | |
| DATASTAGE | | X | |
| SSHGLUE | | X | |
| TPTLOAD | | X | |
| TPTSTRM | | X | |
| FASTEXP | | X | |
| FASTLOAD | | X | |
| INFORMATICA | | X | |
| TPTEXP | | X | |
| EXECUTOR | | X | |
| TBUILD | | X | |
| JDBC | X | | |
| JOBSERVERCHILD | X | | |
| MICROSTRATEGY | X | | |
| TABLEAU | X | | |
| PYTHON | X | | |

SAMPLE:

| APP | TOTAL SCORE | FORMALIZED SCORE (0-1) | SCORE ON A SCALE OF 10 |
|---|---|---|---|
| APP1 | 340 | 0 | 0.0 |
| APP2 | 1200 | 0.039704524 | 0.4 |
| APP3 | 3500 | 0.145891043 | 1.5 |
| APP4 | 22000 | 1 | 10.0 |
| APP5 | 1300 | 0.04432133 | 0.4 |
| APP6 | 3400 | 0.141274238 | 1.4 |
| APP7 | 4000 | 0.168975069 | 1.7 |
| APP8 | 10000 | 0.44598338 | 4.5 |
| APP9 | 12300 | 0.552169898 | 5.5 |
| APP10 | 18000 | 0.815327793 | 8.2 |

Fig. 8

SYSTEMS AND METHODS FOR DETERMINING DATA MIGRATION USING AN AUTOMATED QUERY ANALYZER TOOL

TECHNOLOGICAL FIELD

Example embodiments of the present disclosure relate to systems and methods for determining data migration using an automated query analyzer tool.

BACKGROUND

Data migration can be extremely difficult to plan for, especially when a large number of applications and their objects and code are attempted to migrate at the same time or close in time. The issue is further exacerbated where applications have an interdependency on other applications and databases, and where applications have their own non-standard ways of writing code, executing code, storing code, and/or the like. Such issues may arise where applications provided enhanced features beyond those required by application standards. Thus, there exists a need for a system, method, and/or apparatus to determine data migration capabilities and present applications which are capable of migration in an efficient, automatic, secure, and dynamic manner.

Applicant has identified a number of deficiencies and problems associated with determining data migration for applications and databases in an efficient, secure, and dynamic way. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for determining data migration using an automated query analyzer tool.

In one aspect, a system for determining data migration using an automated query analyzer tool is provided. In some embodiments, the system may comprise: a memory device with computer-readable program code stored thereon; at least one processing device, wherein executing the computer-readable code is configured to cause the at least one processing device to perform the following operations: identify at least one input data set associated with at least one application; analyze, by an automated query analyzer tool, the at least one input data set; classify, by the automated query analyzer tool, data of the at least one data set as at least one of a standard classification or a non-standard classification; determine, by the automated query analyzer tool, at least one metric for the data of the at least one data set; generate, based on the at least one metric, a query complexity score for the at least one application; generate, based on the query complexity score for the at least one application, an application migration complexity report and an application migration complexity report interface component; and transmit the application migration complexity report interface component to a user device and configure a graphical user interface of the user device with the application migration complexity report interface component.

In some embodiments, the at least one input data set is identified from at least one of a database, an index, or a query log associated with the at least one application.

In some embodiments, the standard classification comprises an American National Standard Institute (ANSI) classification, and wherein the non-standard classification comprises a non-ANSI classification.

In some embodiments, the data comprises a query, and wherein the at least one metric for the data of the at least one data set comprises a metric for at least one of query like join counts, datatype count, function count, or keyword count of the query.

In some embodiments, the computer-readable code is configured to cause the at least one processing device to perform the following operations: receive a user input identifying the at least one application for migration to a target database, wherein the user input comprises an identification of at least one input data type for the input data set; and trigger, based on receiving the user input identifying the at least one application, the automated query analyzer tool to analyze the at least one input data set.

In some embodiments, the computer-readable code is configured to cause the at least one processing device to perform the following operations: generate a knowledgebase comprising training data associated with the at least one application, wherein the training data comprises at least one of a database specific keyword, a function, a datatype, the standard classification, or the non-standard classification; apply the training data to the automated query analyzer tool; and train, based on applying the training data, the automated query analyzer tool. In some embodiments, the training data comprises at least one user input.

In some embodiments, the query complexity score is generated by a query complexity scoring model, and wherein the query complexity scoring model is specific for a database identifier of the at least one application.

In some embodiments, the application migration complexity report is interactive.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
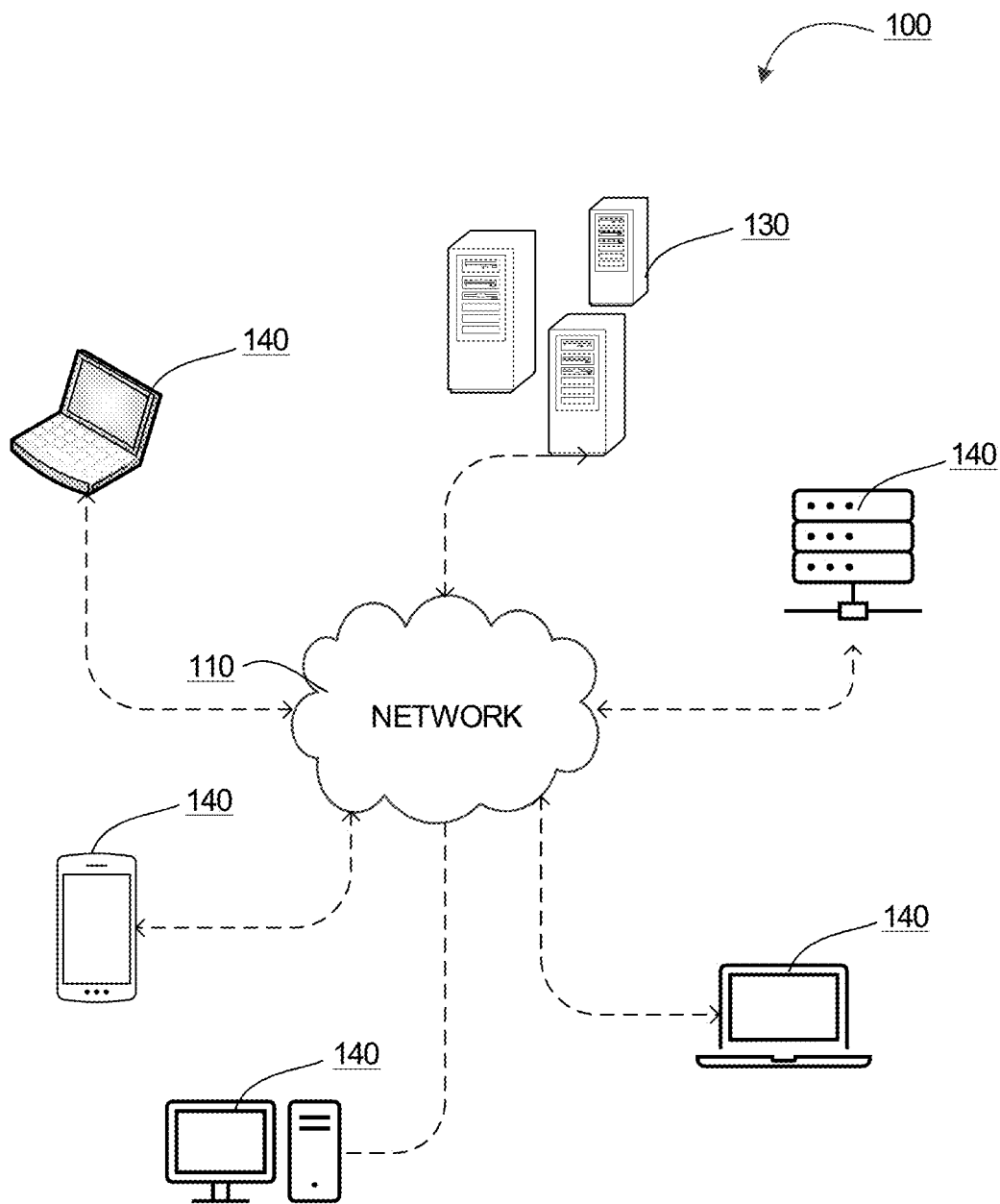
Figure 1B:
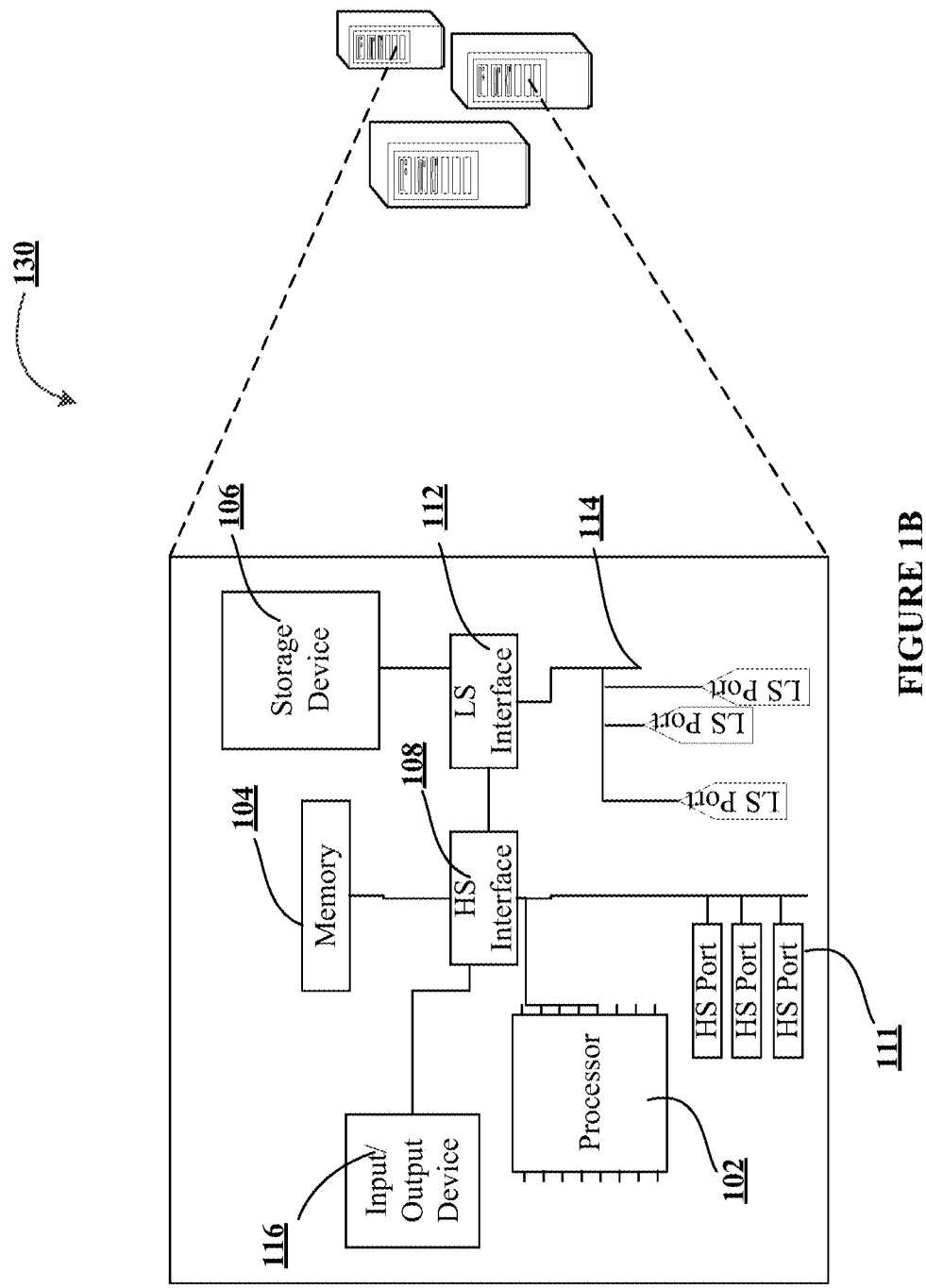
Figure 1C:
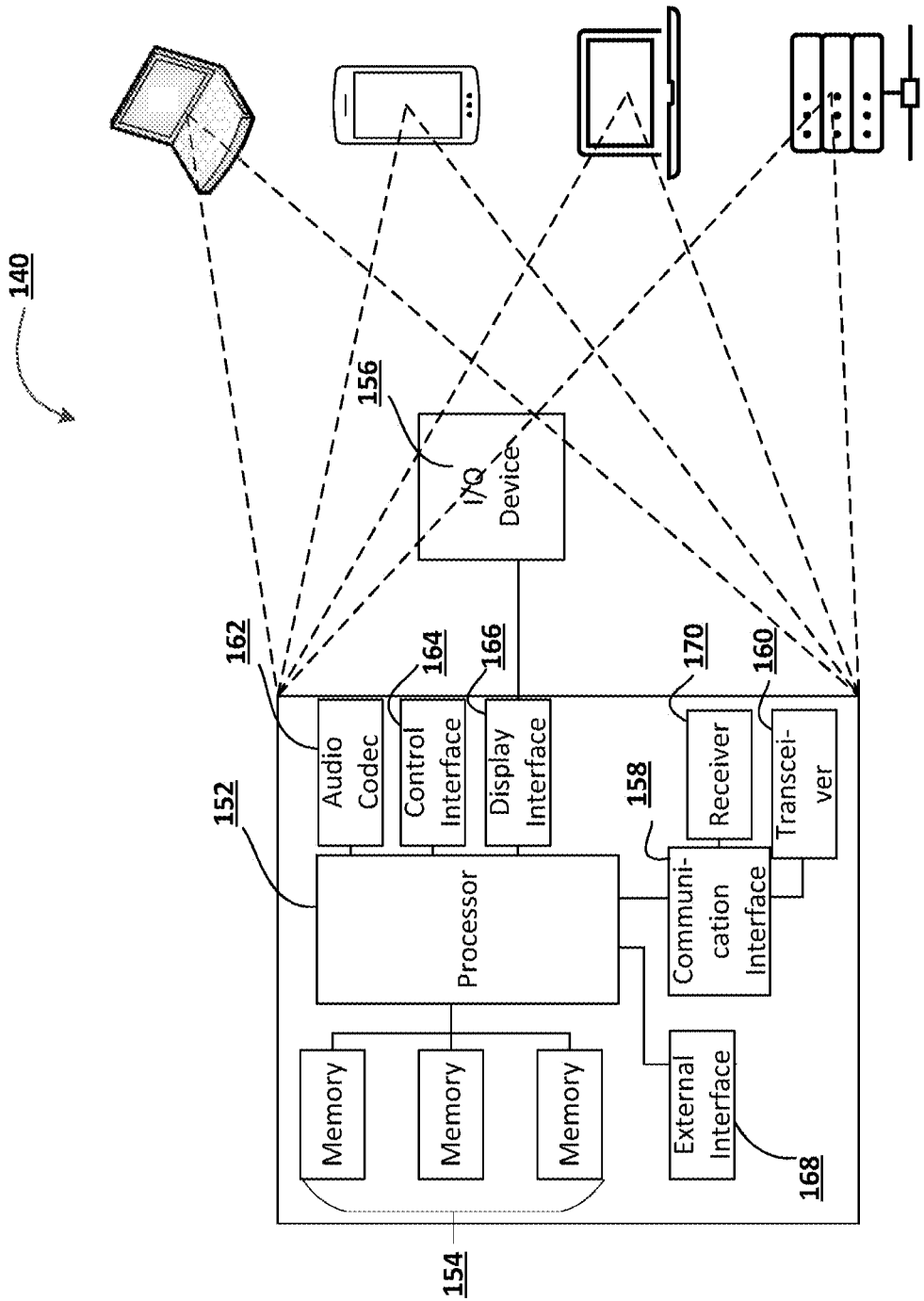
Figure 2:
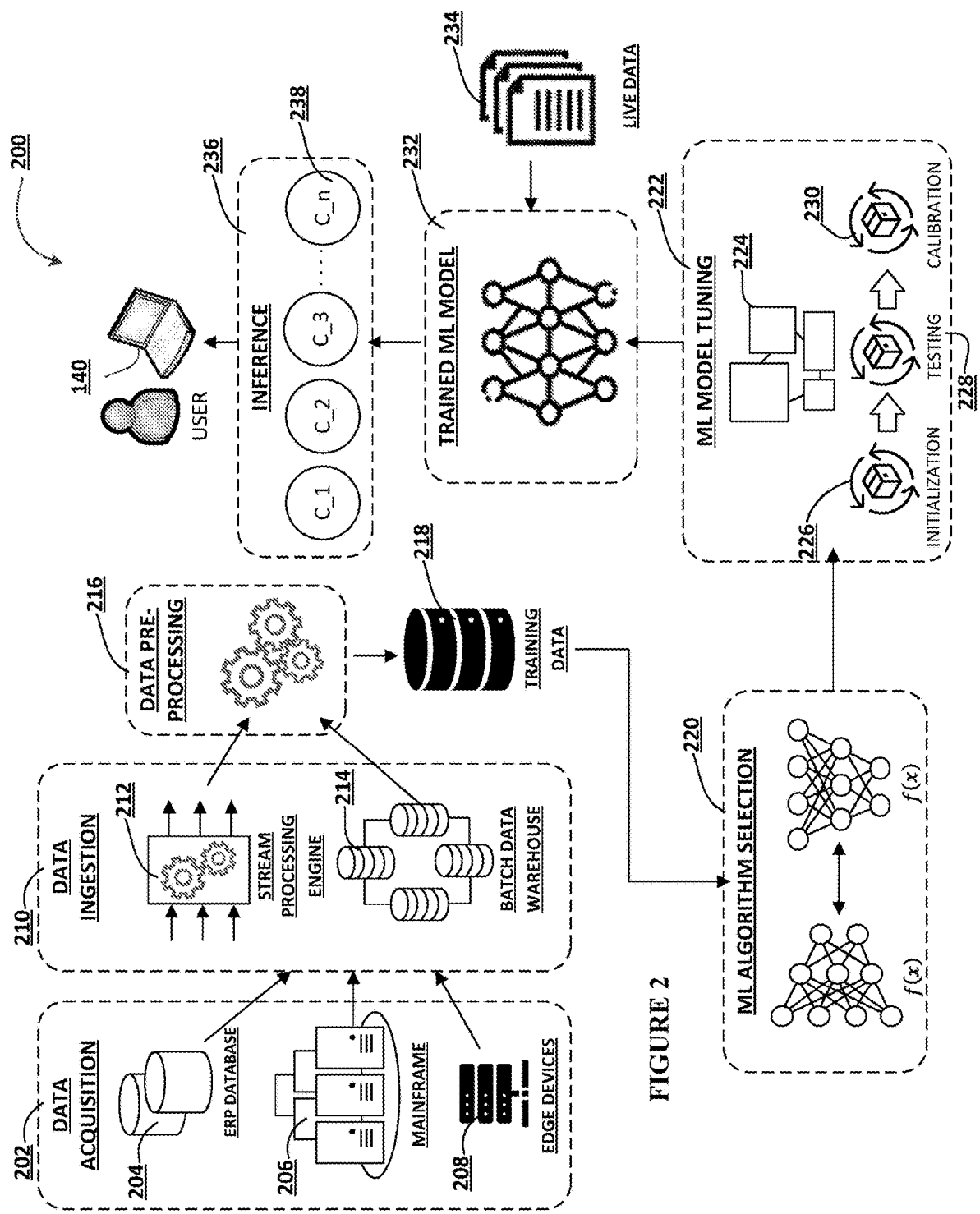
Figure 3:
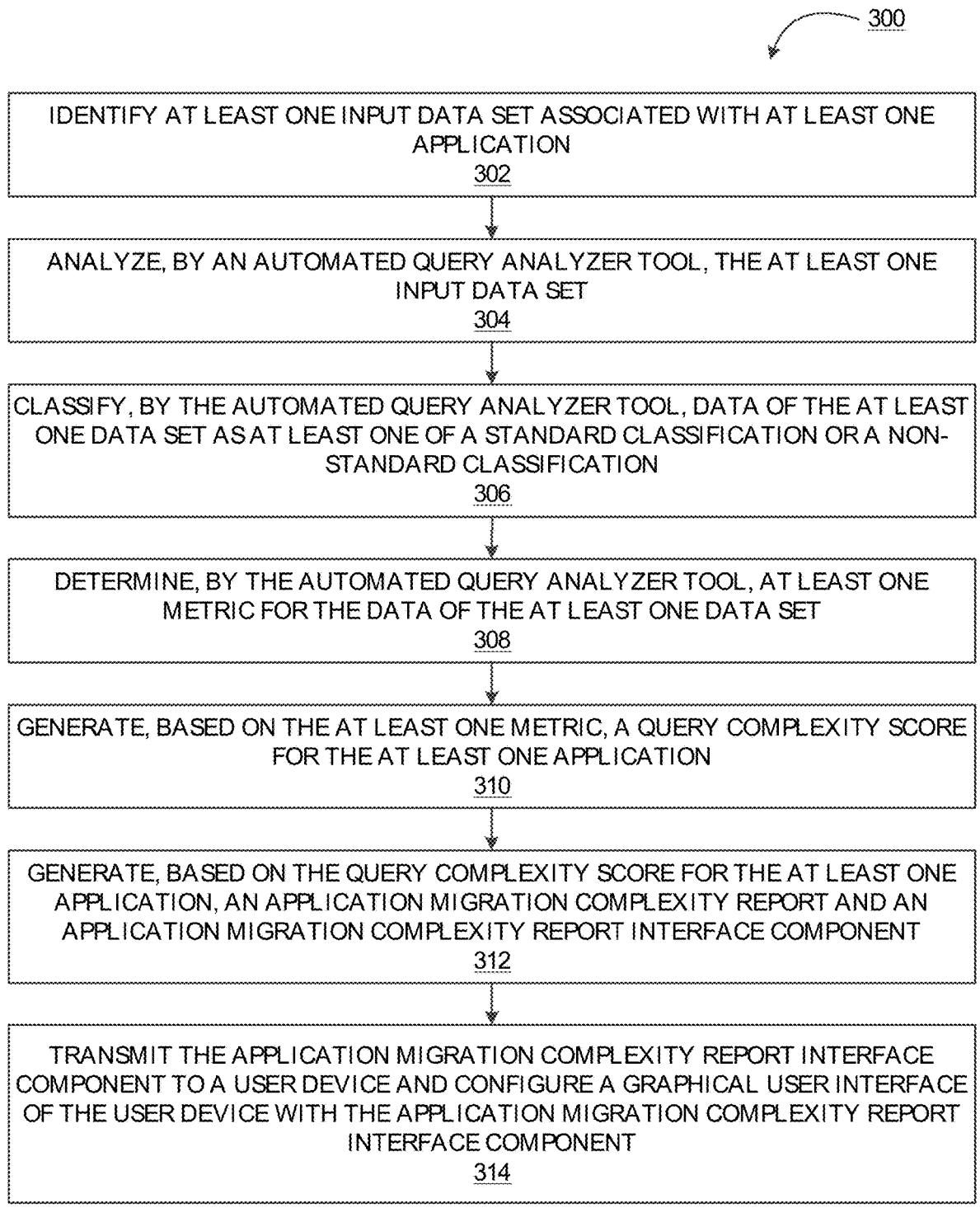
Figure 4:
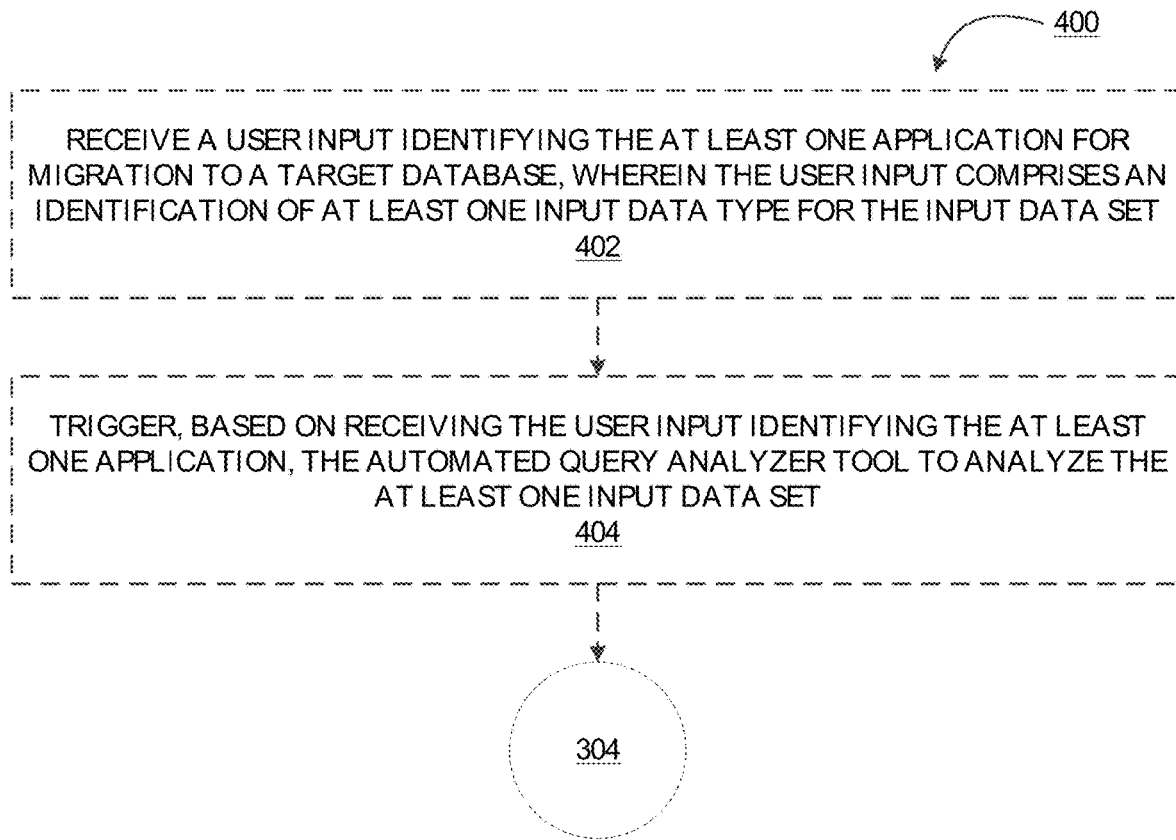
Figure 5:
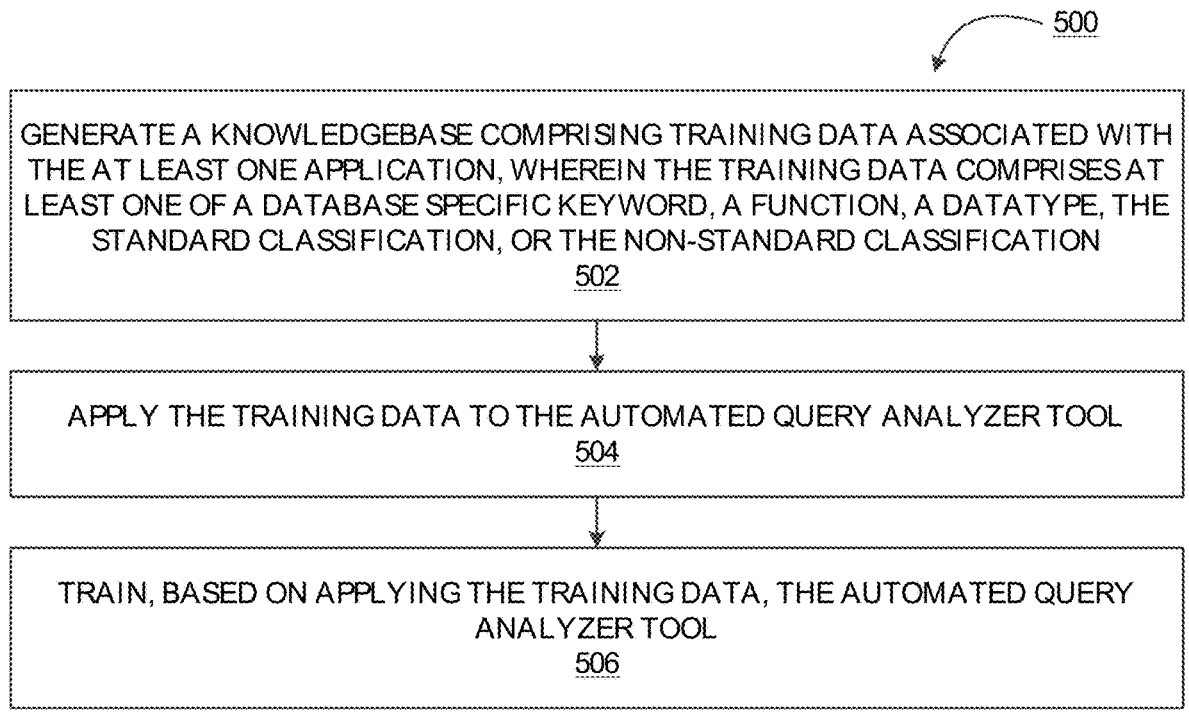
Figure 6:
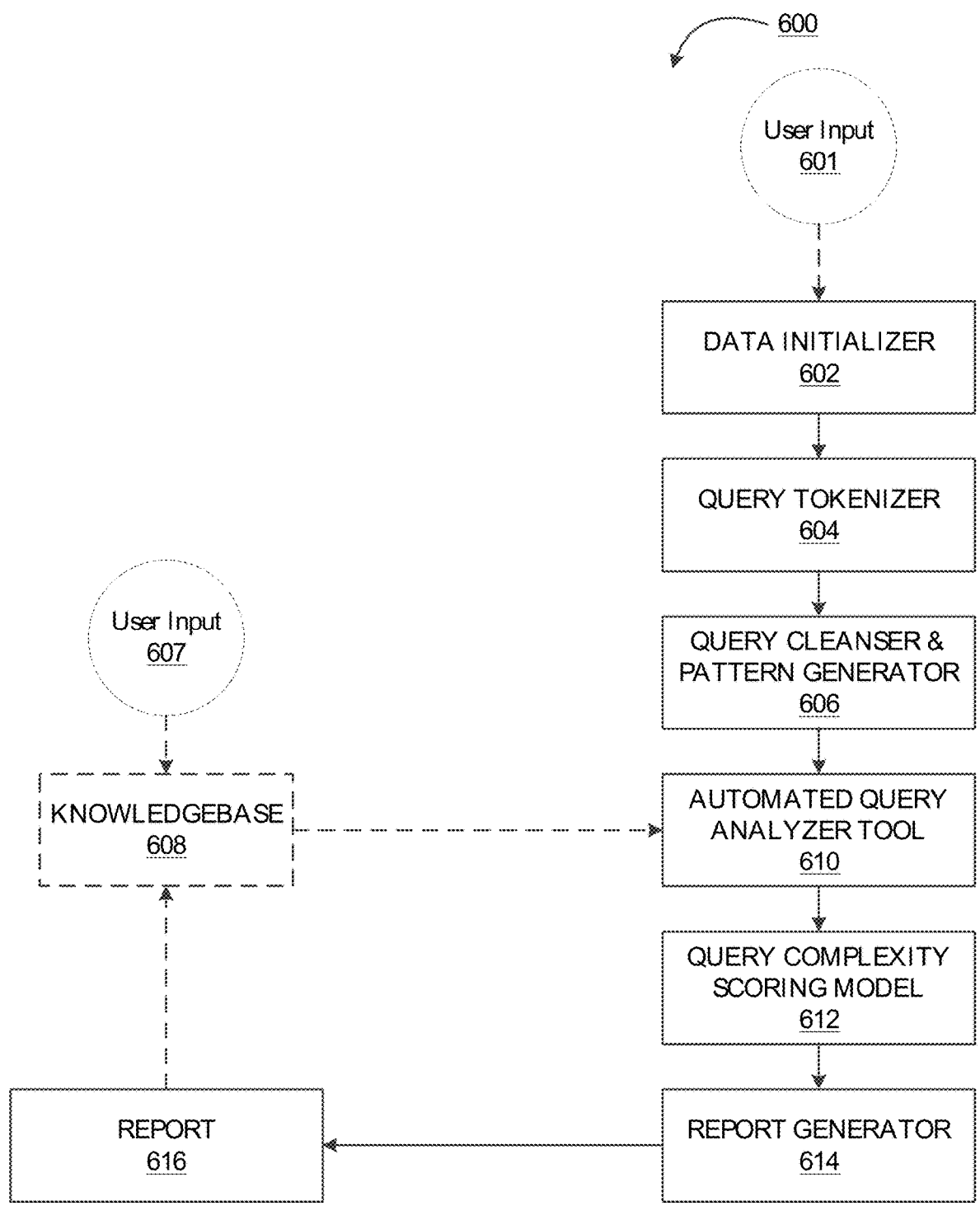
Figure 7:
Figure 9:
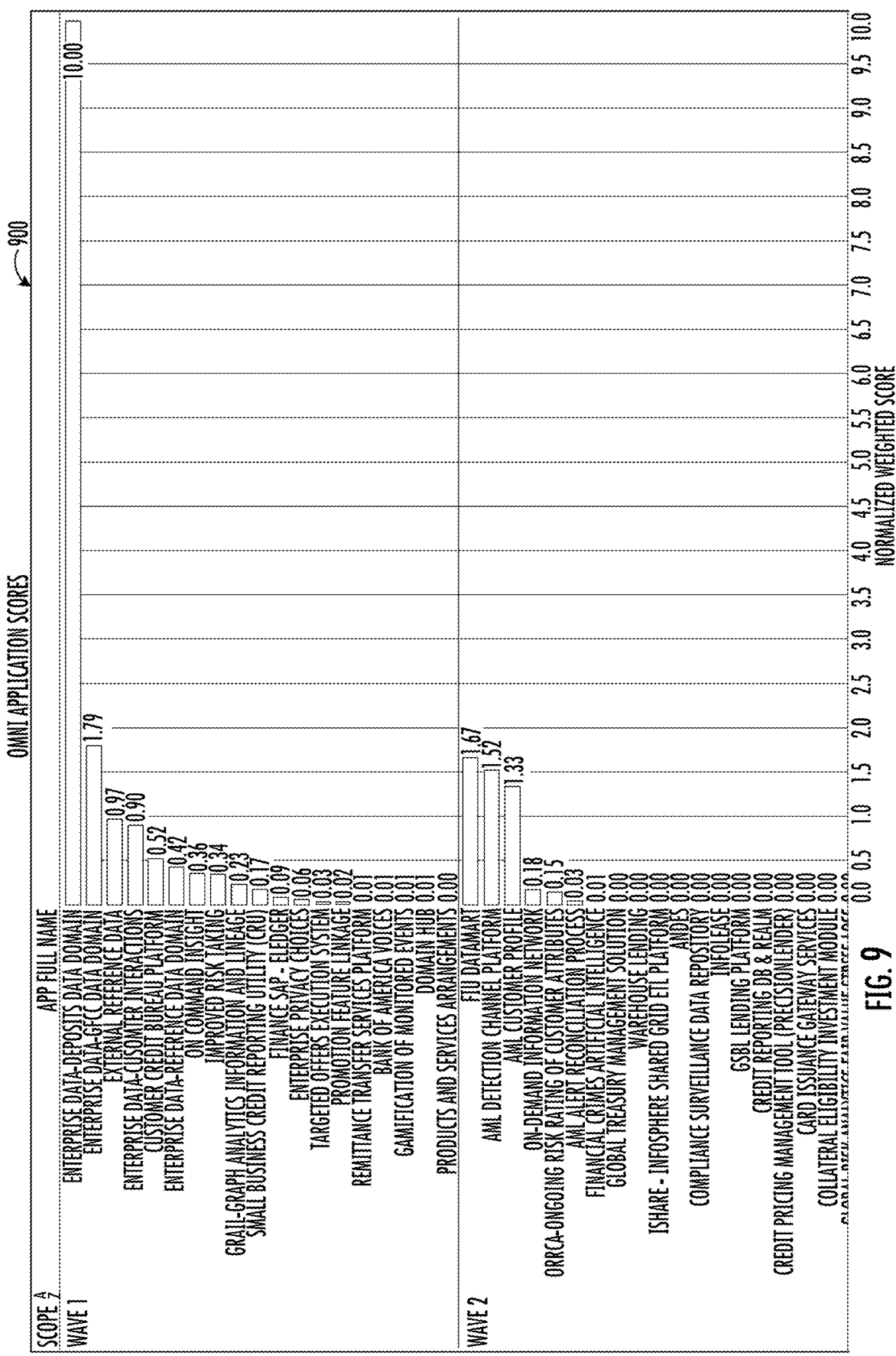
Figure 10:
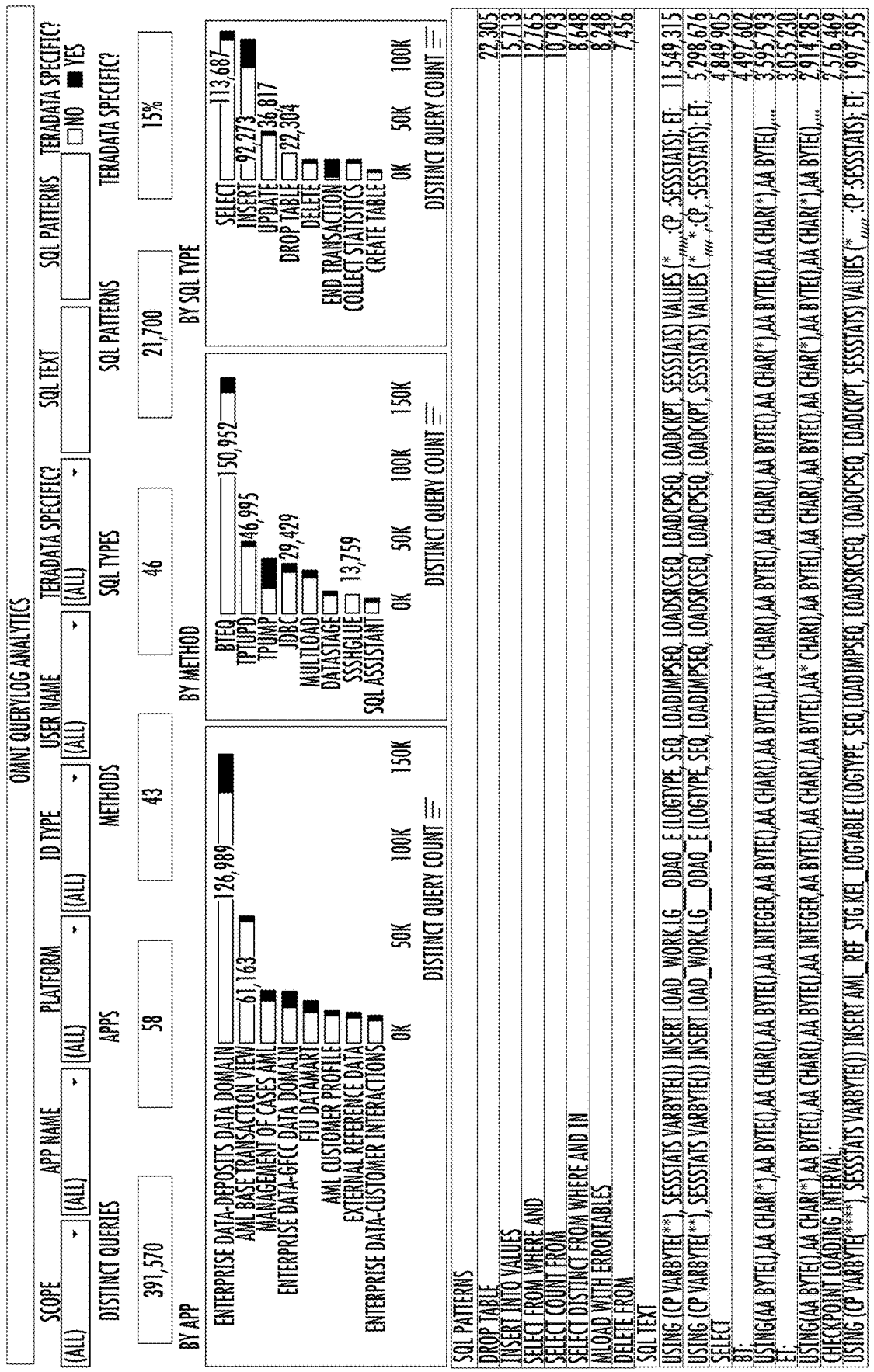

FIGS. 1A-1C illustrates technical components of an exemplary distributed computing environment for determining data migration using an automated query analyzer tool, in accordance with an embodiment of the disclosure;

FIG. 2 illustrates an exemplary machine learning (ML) subsystem architecture, in accordance with an embodiment of the disclosure;

FIG. 3 illustrates a process flow for determining data migration using an automated query analyzer tool, in accordance with an embodiment of the disclosure;

FIG. 4 illustrates a process flow for triggering the automated query analyzer tool to analyze the at least one input data set, in accordance with an embodiment of the disclosure;

FIG. 5 illustrates a process flow for training the automated query analyzer tool, in accordance with an embodiment of the disclosure;

FIG. 6 illustrates an exemplary block diagram for determining data migration using an automated query analyzer tool, in accordance with an embodiment of the disclosure;

FIG. 7 illustrates an exemplary GUI comprising a knowledgebase of keywords, functions, and datatypes, in accordance with an embodiment of the disclosure;

FIG. 8 illustrates an exemplary query complexity scoring model, in accordance with an embodiment of the disclosure;

FIG. 9 illustrates an exemplary application migration complexity report, in accordance with an embodiment of the disclosure; and FIG. 10 illustrates an exemplary application migration complexity report interface component with interactive capabilities, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Data migration can be extremely difficult to plan for, especially when a large number of applications and their objects and code are attempted to transfer at the same time or close in time. The issue is further exacerbated where applications have an interdependency on other applications and databases, and where applications have their own non-standard ways of writing code, executing code, storing code, and/or the like. Such issues may arise where applications provided enhanced features beyond those required by application standards. Thus, there exists a need for a system, method, and/or apparatus to determine data migration capabilities and present applications which are capable of migration in an efficient, automatic, secure and dynamic manner.

Thus, this disclosure provides a system that implements an automated query analyzer tool which only uses data platform and/or database details as input (including application query logs) and which outputs a list of applications with migration rankings comprising a data migration complexity for each application. Further, and in some embodiments, the system may output an interactive report for users to analyze the query patterns of the applications and each application's complexity of data migration to a target application, database, and/or data platform. The system may use a query complexity scoring model that analyzes SQL strings, keywords, functions, operators, datatypes, utilities, execution methods, number of joins, and/or the like in order to generate the overall complexity scores of each application, which in turn may be used to determine how easily the application will be to migrate to a target application, database, network, and/or platform (e.g., the higher the query complexity score, the higher the complexity of the application, and the more difficult the application will be to migrate).

Accordingly, the present disclosure provides for identifying at least one input data set associated with at least one application (e.g., such as a query log of the application); analyzing, by an automated query analyzer tool, the at least one input data set (e.g., which may occur after cleansing, filtering, and tokenizing the input data set); classifying, by the automated query analyzer tool, data of the at least one data set as at least one of a standard classification (ANSI standard) or a non-standard classification (non-ANSI standard); determining, by the automated query analyzer tool, at least one metric for the data of the at least one data set; generating, based on the at least one metric, a query complexity score for the at least one application (e.g., an overall complexity score of the application); generating, based on the query complexity score for the at least one application, an application migration complexity report and an application migration complexity report interface component; and transmitting the application migration complexity report interface component to a user device and configure a graphical user interface of the user device with the application migration complexity report interface component.

What is more, the present disclosure provides a technical solution to a technical problem. As described herein, the technical problem includes determining data migration for applications and databases. The technical solution presented herein allows for determining data migration capabilities and present applications which are capable of migration in an efficient, automatic, secure and dynamic manner. In particular, the data migration analyzer system is an improvement over existing solutions to the data migration issues identified herein, (i) with fewer steps to achieve the solution, thus reducing the amount of computing resources, such as processing resources, storage resources, network resources, and/or the like, that are being used (e.g., by cleansing, filtering, tokenizing data, and by employing an automated query analyzer tool and a query complexity scoring model to generate the solution); (ii) providing a more accurate solution to problem, thus reducing the number of resources required to remedy any errors made due to a less accurate solution (e.g., by keeping an up-to-date knowledgebase of each of the keywords, functions, datatypes, and/or the like and continuously refining and retuning at least the automated query analyzer tool and, in some embodiments, the query complexity scoring model); (iii) removing manual input and waste from the implementation of the solution, thus improving speed and efficiency of the process and conserving computing resources (e.g., by implementing and updating the knowledgebase); (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for determining data migration using an automated query analyzer tool 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer-or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation-and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for determining data migration using an automated query analyzer tool, in accordance with an embodiment of the disclosure. In some embodiments, a system (e.g., similar to one or more of the systems described herein with respect to FIGS. 1A-1C and 2) may perform one or more of the steps of process flow 300. For example, a data migration analyzer system (e.g., the system 130 described herein with respect to FIG. 1A-1C) may perform the steps of process 300. For example, a trained machine learning model (e.g., the system 232 described herein with respect to FIG. 2) and/or a computation model may perform some steps of process 300.

As shown in block 302, the process flow 300 may include the step of identifying at least one input data set associated with at least one application. For instance, the data migration analyzer system may identify at least one input data set from at least one database, at least one index, at least one storage component, and/or the like associated with at least one application. In this manner, the data migration analyzer system may be configured to identify and/or collect data associated with an application, such as data from query logs stored in a database(s), in an index(es), in a storage component(s), and/or the like, whereby such query logs may comprise all the running and completed queries (e.g., requests within the application and/or requests to access or disconnect from the application) that were historically run. As used herein, the query logs refer to a log of Structured Query Language (SQL) queries in a relational database, index, and/or the like. In some embodiments, the query logs may only comprise the queries run in a predetermined historical period, such as but not limited to the last seven days, the last fourteen days, the last twenty-one days, the last thirty or thirty-one days, and/or the like. In some aspects, the query logs may comprise all the queries run historically, such that the query logs are a complete historical record for the associated application.

In some embodiments, the input data set may be identified and/or collected by the data migration analyzer system such that each application associated with the data migration analyzer system, associated with a network, and/or associated with a computer processor, is analyzed. In some embodiments, only a certain pre-identified set of applications are analyzed by the data migration analyzer system, whereby such a pre-identified set may be pre-identified based on at least one user input indicating which applications are intended for migration. For example, the data migration analyzer system may receive at least one application identifier from a user input received at a user device which is in communication (e.g., via a network) with the data migration analyzer system, and transmitted to the data migration analyzer system to identify which application(s) are intended to be migrated to a target database, a target network, a target system, and/or the like. Such an embodiment is described in further detail below with respect to FIG. 4.

In some embodiments, the user input may comprise an application identifier and/or may comprise an application attribute (e.g., such as the applications which comprise an attribute indicating an application is associated with a security measure to protect the network, and/or the like) which may be used by the data migration analyzer system to identify a plurality of applications with the same attribute to analyze for migration. In this manner, the user input to identify which applications to analyze without individually identifying each application with their application identifiers, which may—in turn—save time and resources by the data migration analyzer system in identifying and collecting each application's data sets.

As used herein, the at least one input data set is identified and/or collected from at least one database, at least one index, or at least one storage component, whereby the at least one input data set may comprise at least one query log associated with the at least one application (or a plurality of query logs associated with the at least one application). In some embodiments, the input data set may comprise at least one of an SQL keyword (e.g., words or terms that have significance within SQL such as but not limited to, "SELECT," "DELETE," and/or "BIGINT"); an SQL function (e.g., a database object in an SQL server, which may return only a single value or table); an SQL datatype (e.g., an attribute that specifies the type of data that can be used within the SQL server, such as but not limited to integer data, character data, monetary data, date and time data, binary strings, and/or the like); an SQL utility (e.g., tools and/or applications which help sort, organize, create, update, and/or the like of the data within the SQL servers and/or databases); an SQL execution method (e.g., a method for executing queries in the SQL server which describe which process the steps are performed in executing the queries); a number of joins; and/or the like.

As used herein, the number of joins refers to identified relationships between at least one table within a database, whereby such a relationship may be identified based on the at least one table comprising the same or similar values, the same or similar types of data, and/or the like. (e.g., which are used to define relationships between at least one table, such as a table within a database that comprises the same or similar values or the same or similar types of data). In this manner, the number of joins may be used in association with a join clause to join or combine columns (and/or rows) from one or more tables into a new table. Such a join clause may comprise an inner join, a full outer join, a left outer join, a right outer join, and/or the like, whereby the inner joins result in an intersection of at least two tables, and whereby outer joins result in the combination or union of at least two tables.

As shown in block 304, the process flow 300 may include the step of analyzing—by an automated query analyzer tool—the at least one input data set. For example, the data migration analyzer system may analyze—through the use of an automated query analyzer tool—the at least one input data set associated with the at least one application, whereby the automated query analyzer tool may be used to determine which applications are the most complex to migrate to the target database, network, and/or the like, and which applications will be the easiest (or least complex) to migrate to the target database, network, and/or the like.

In some embodiments, the data migration analyzer system may tokenize the input data set into a bag or sets of keywords/words, terms, numbers, and/or the like. In this manner, the tokenization may be used by the data migration analyzer system to break up and/or parse the input data set into smaller pieces of data for a more granular analyzation. Such a tokenization may occur before the automated query analyzer tool analyzes the data of the input data set.

Similarly, and prior to the automated query analyzer tool analyzing the data of the input data set, the data migration analyzer system may additionally cleanse and/or filter the data of the input data set (e.g., before and/or after the tokenization of the input data). Such a cleansing and filtering may comprise a removal of all non-keyword string terms, words, letters, numbers, and/or the like, whereby only the important pieces of the pattern of each query is kept. Thus, such a cleansing and filtering may comprise the removal of all non-keyword string literals, such that only the understood patterns of the queries are kept without extra-solution terms, keywords, numbers, comments, and/or the like.

In some embodiments, the cleansing and filtering of data of the input data set may comprise a cleansing of repetitive data (e.g., data already considered such as particular functions, datatypes, keywords, and/or the like that have already been sorted into the data to be analyzed by the automated query analyzer tool), such that only one specific data will be analyzed at one time by the query analyzer tool, rather than multiple forms of the same data analyzed multiple times (e.g., in a repetitive nature). In this manner, the cleansing and filtering of data improves processing speeds, storage capabilities, resources used and/or the like by the data migration analyzer system, without cleansing and filtering data which may be considered important (e.g., data that is only present once and is unique).

In some embodiments, the data migration analyzer system may then analyze the input data (e.g., after cleansing/filtering and/or tokenizing) using the automated query analyzer tool, whereby the automated query analyzer tool is pre-trained based on a knowledgebase to determine which keywords of the query log(s), and/or the like are database specific (e.g., non-American National Standard Institute (non-ANSI) keywords), database specific functions, database specific datatypes, and/or the like and which keywords of the query logs are not database specific (e.g., ANSI keywords, non-database specific functions, non-database specific datatypes, and/or the like. Thus, the greater the non-ANSI keywords, non-ANSI specific functions, non-ANSI specific datatypes, and/or the like, the more complex and more customized the keywords, functions, datatypes, and/or the like are to the application or database and the greater the difficulty to convert and/or migrate to a target database, target network, and/or the like.

As shown in block 306, the process flow 300 may include the step of classifying—by the automated query analyzer tool—data of the at least one data set as at least one of a standard classification or a non-standard classification. For instance, the data migration analyzer system may classify—using the automated query analyzer tool—the data from the at least one input data set as comprising a standard classification or a non-standard classification, wherein the standard classification comprises an American National Standard Institute (ANSI) classification (which is not database or application specific, but a standard within the industry), and wherein the non-standard classification comprises a non-ANSI classification (which would be database specific, application specific, and/or the like).

In this manner, the data migration analyzer system may classify each of the pieces of data from the input data set as a standard classification (e.g., ANSI classification) or a non-standard classification (e.g., non-ANSI classification). In some embodiments, and additionally and/or alternatively, the standard classification may be based on previously understood keywords that have already been in a database that has migrated, so the data migration analyzer system knows how to work with the standard classified keywords, functions, datatypes, and/or the like. In some embodiments, such standard classifications may be continuously and dynamically updated in the knowledgebase of the automated query analyzer tool.

As shown in block 308, the process flow 300 may include the step of determining—by the automated query analyzer tool—at least one metric for the data of the at least one data set. For example, and based on the standard classifications and non-standard classifications of each keyword, each function, each datatype, and/or the like of the data, the data migration analyzer system may determine at least one metric for each piece of data. In some embodiments, the higher the metric(s), the higher the complexity of the data for migration (e.g., the greater the non-ANSI classification of the keyword(s), function(s), datatype(s), and/or the like). As used herein, a metric may be generated for each of the pieces of data of the input data set, and may then be used (e.g., aggregated) to generate the query complexity score for the application, whereby each metric may be weighted individually and/or as weighted as combinations (e.g., certain types of data may be weighted different than other types of data).

For instance, the metric for the data may be based on the standard classification or non-standard classification for the keyword(s), function(s), datatype(s) which may further comprise at least one of a join count(s) (e.g., such as the number of join counts within a function or datatype and the associated standard classification and/or non-standard classification for the join count(s)), datatype count(s), function count(s), keyword count(s), and/or the like for each piece of data associated with an input data set.

In some embodiments, the metric for each piece of data is based on the complexity of the data to migrate to a target database or target network, whereby the greater the non-ANSI classified keywords (non-standard classified keywords, functions, datatypes) of the data, the greater the metric indicating a higher complexity. Similarly, the greater the ANSI classified keywords (standard classified keywords, functions, datatypes), the lower the metric and the lower the complexity and the easier the migration will be.

As shown in block 310, the process flow 300 may include the step of generating—based on the at least one metric—a query complexity score for the at least one application. For example, the data migration analyzer system may generate—based on the metric(s) generated in block 308 for each piece of data of the input data set(s)—a query complexity score for each application, whereby the metrics of all the pieces of data of the input data set (i.e., the data that has been cleansed/filtered and/or tokenized) are used and aggregated to generate the query complexity score for the each entire application. Such a query complexity score may then be used to determine the overall complexity of each application, based on the individual metrics that have been aggregated from each piece of data, whereby the greater the query complexity score the harder the application may be to migrate to a target database, target network, and/or the like.

In some embodiments, the metric is based on the complexity of the at least one data set for the application/database, whereby the greater the non-ANSI classified keywords, functions, datatypes of the at least one data set, the greater the metric indicating a higher complexity. Similarly, the greater the ANSI classified keywords vs. non-ANSI classified keywords, the lower the metric and the lower the complexity for the customized keywords that are not standard within ANSI/computing systems, and the easier the migration will be.

In some embodiments, the query complexity score is generated by a query complexity scoring model, whereby the query complexity scoring model is specific to a database identifier of the at least one application. In this manner, a query complexity scoring model may be pre-trained for at least one specific database, application and/or vendor (e.g., vendor of an application or database), such that the query complexity scoring model is specifically used to generate the query complexity scores only for the query logs associated with a single, identified vendor, application or database. In this manner, and where the vendor, application or database has previously been analyzed by the data migration analyzer system, the data migration analyzer system may store its previously generated metrics for each previously analyzed keyword, function, datatype, and/or the like, such that the generation of the query complexity score is streamlined, improves processing speeds, and does not require greater resources than necessary.

In some embodiments, the query complexity scoring model may be a trained machine learning model, such as that exemplarily shown in FIG. 2. In some embodiments, the query complexity scoring model may be a computational model which is pre-trained based on adjusting the variables (e.g., the weightages and/or the scores/metrics of data) to get an allowable output (e.g., an allowable query complexity score for at least one application in a previous, training instance. In some embodiments, such variables may be adjusted based on human or manual input to the computational model until a simulated output comprises an acceptable value for a pre-identified application.

As shown in block 312, the process flow 300 may include the step of generating—based on the query complexity score for the at least one application—an application migration complexity report and an application migration complexity report interface component. For example, the data migration analyzer system may generate an application migration complexity report comprising the query complexity score(s) for each of the application(s) analyzed by the data migration analyzer system in one place. Such an application migration complexity report may comprise an application identifier for each of the applications analyzed by the data migration analyzer system, an element for each application identifier indicating the overall complexity of the application, a ranking element for each application identifier whereby each application is ranked from least complex (e.g., lowest query complexity score) to most complex (e.g., highest query complexity score) for migration, and/or the like. An example application migration complexity report is shown in FIGS. 9 and 10 and described below.

As used herein, the application migration complexity report interface component comprises a data packet of the data of the application migration complexity report in computer-readable program code, which may be transmitted to a user device (via a network) and used to configure a graphical user interface (GUI) of the user device to show the application migration complexity report in a human-readable format.

In some embodiments, the application migration complexity report is interactive, such that the application migration complexity report may dynamically change based on a user's input(s) at the user device. In this manner, the application migration complexity report interface component may be configured to dynamically accept user input—in real time—based on receiving the user input at the user device and asynchronously change the application migration complexity report. In some embodiments, the user input at the application migration complexity report interface component comprises an indication to re-run the analyzation process of the data, to run a new analyzation of a newly identified application, to filter out applications from the application migration complexity report (e.g., those applications that comprise a query complexity score above a query complexity score threshold may be filtered out as too complex for migration at the current time), input in more applications, alter the layout of the report, highlight certain applications and their associated elements, re-sort the report and the associated applications based on the filtering choices, and/or the like.

As shown in block 314, the process flow 300 may include the step of transmitting the application migration complexity report interface component to a user device and configure a graphical user interface (GUI) of the user device with the application migration complexity report interface component. For example, the data migration analyzer system may transmit—over a network—to a user device, the application migration complexity report interface component and cause the user device's GUI to be configured (based on receiving the application migration complexity report interface component). Such a receipt of the application migration complexity report interface component may cause the user device to trigger the configuration of the GUI automatically.

Such a configuration of the GUI with the application migration complexity report interface component may be used to show a user of the user device the application migration complexity report and its associated data, which may include its interactive capabilities.

As used herein the user device may be associated with a client of the system (e.g., an entity wishing to migrate their applications and/or databases, which may comprise a plurality of user devices that have access to the client's network such as user that are employed by the client), with a manager of the system (e.g., the owner and/or operator of the system), and/or the like.

FIG. 4 illustrates a process flow 400 for triggering the automated query analyzer tool to analyze the at least one input data set, in accordance with an embodiment of the disclosure. In some embodiments, a system (e.g., similar to one or more of the systems described herein with respect to FIGS. 1A-1C and 2) may perform one or more of the steps of process flow 400. For example, a data migration analyzer system (e.g., the system 130 described herein with respect to FIG. 1A-1C) may perform the steps of process flow 400. For example, a trained machine learning model (e.g., the system 232 described herein with respect to FIG. 2) and/or a computation model may perform some steps of process flow 400.

In some embodiments, and as shown in block 402, the process flow 400 may include the step of receiving a user input identifying the at least one application for migration to a target database, wherein the user input comprises an identification of at least one input data type for the input data set. For example, the data migration analyzer system may receive a user input identifying at least one application for migration such as but not limited to a user input from a user device by the user interacting with input component(s) (keyboard, mouse, microphone, and/or the like) and inputting an application identifier that the user wishes to transfer/migrate to a target database. In some embodiments, the user input may comprise a plurality of application identifiers that the user wishes to migrate, and/or may comprise an application attribute that the user wishes applications with the same attribute to be migrated.

In some embodiments, the input data collected and/or identified is based on input parameters from a user, whereby such input parameters may comprise an indication of what applications/databases to migrate, what data of each database to migrate (e.g., all or only portions of data associated with an application), if there is specific data to consider when analyzing the input data sets for migration, and/or the like.

In some embodiments, and as shown in block 404, the process flow 400 may include the step of triggering—based on receiving the user input identifying the at least one application—the automated query analyzer tool to analyze the at least one input data set. For example, the data migration analyzer system may trigger the automated query analyzer tool to start analyzing the data (e.g., such as the process described with respect to blocks 304-314). Thus, the steps provided in FIG. 4 may precede the steps provided in process flow blocks 304-314.

As used herein, the term trigger refers to an automatic initiation and/or automatic start of the automated query analyzer tool to analyze the data of the input dataset, once the user input has been received and identified (e.g., once the user input has been parsed and understood by the system for which databases and/or applications to analyze for potential migration).

FIG. 5 illustrates a process flow 500 for training the automated query analyzer tool, in accordance with an embodiment of the disclosure. In some embodiments, a system (e.g., similar to one or more of the systems described herein with respect to FIGS. 1A-1C and 2) may perform one or more of the steps of process flow 500. For example, a data migration analyzer system (e.g., the system 130 described herein with respect to FIG. 1A-1C) may perform the steps of process 500. For example, a trained machine learning model (e.g., the system 232 described herein with respect to FIG. 2) and/or a computation model may perform some steps of process 500.

In some embodiments, and as shown block 502, the process flow 500 may include the step of generating a knowledgebase comprising training data associated with the at least one application, wherein the training data comprises at least one of a database specific keyword, a function, a datatype, the standard classification, or the non-standard classification. For example, the data migration analyzer system may generate a knowledgebase comprising training data associated with the at least one application, whereby the training data may be pre-tagged pieces of data (such as pre-tagged keywords, functions, datatypes, and/or the like) with a standard classification and/or a non-standard classification. In some embodiments, the pre-tagging of the data may comprise a user-provided pre-tagging, such that the data migration analyzer system (e.g., the automated query analyzer tool) is trained to identify each piece of data as a keyword, a function, a datatype, and/or the like and such that each piece of data can be classified with a standard classification or a non-standard classification.

In some embodiments, and as shown in block 504, the process flow 500 may include the step of applying the training data to the automated query analyzer tool. For example, the data migration analyzer system may apply the training data to the automated query analyzer tool by allowing the automated query analyzer tool to process the training data. Such application of the training data (and other such training data sets which may be applied at future times) may be used to train the automated query analyzer tool to make future determinations of data. In some embodiments, the training data may additionally and/or alternatively be applied to the query complexity scoring model for training the query complexity scoring model to generate future query complexity scores for applications.

In some embodiments, and as shown in block 506, the process flow 500 may include the step of training—based on applying the training data—the automated query analyzer tool. For example, the data migration analyzer system may train the automated query analyzer tool by applying, at least at a first instance, the training data. In some embodiments, and upon generating a plurality of training sets at a plurality of instances, the data migration analyzer system may continuously train the automated query analyzer tool. In some embodiments, the configured GUI with the application migration complexity report interface component may comprise an element requesting user input of whether the generating application migration query complexity report is correct (including its associated query complexity scores, ranking, and/or the like). Based on the configured GUI, the data migration analyzer system may request user input indicating a positive feedback (e.g., the application migration query complexity report is correct) or a negative feedback (e.g., the application migration query complexity report is incorrect), and based on the feedback, the data migration analyzer system may further train the automated query analyzer tool.

In some embodiments, the automated query analyzer tool may be trained for all the databases/applications associated with a network (e.g., associated and/or used by a client of the data migration analyzer system) and/or may be trained for each database or application, individually. In some embodiments, a specific automated query analyzer tool may be trained for a specific database/application, such that there are a plurality of automated query analyzer tools for a plurality of databases and/or applications.

FIG. 6 illustrates an exemplary block diagram 600 for determining data migration using an automated query analyzer tool, in accordance with an embodiment of the disclosure. In some embodiments, a system (e.g., similar to one or more of the systems described herein with respect to FIGS. 1A-1C and 2) may perform one or more of the steps of block diagram 600. For example, a data migration analyzer system (e.g., the system 130 described herein with respect to FIG. 1A-1C) may perform the steps of diagram 600. For example, a trained machine learning model (e.g., the system 232 described herein with respect to FIG. 2) and/or a computation model may perform some steps of diagram 600.

In some embodiments, and as shown in the exemplary block diagram 600, the process for determining data migration using an automated query analyzer tool may comprise the data migration analyzer system receiving a user input 601 (e.g., such as user input comprising application identifiers of which applications to be analyzed by the data migration analyzer system for potential migration, parameters for the applications considered, application attributes, and/or the like), a data initializer 602, a query tokenizer 604, a query cleanser and pattern generator 606, an automated query analyzer tool 610, knowledgebase 608, a query complexity scoring model 612, a report generator 614, and a report 616.

As used herein, the data initializer 602 of the data migration analyzer system may be configured to connect to a database and/or an application, identify the input data set(s), and collect all the query logs of the input data set(s) based on the user input 601. In this manner, the data initializer 602 is configured to identify and collect all the input data set(s) associated with the application(s) that are identified for potential migration.

The query tokenizer 604 of the data migration analyzer system may be configured to tokenize all the queries (e.g., keywords, functions, datatypes, and/or the like) in order to separate the keywords, words, terms, numbers, and/or the like into bags of keywords, words, terms, numbers, and/or the like. In this manner, the query tokenizer 604 is tasked with breaking up and/or parsing the input data set into smaller pieces of data for a more granular analyzation.

The query cleanser and pattern generator 610 of the data migration analyzer system may be configured to remove all non-keyword string literals and keep only the patterns of the queries. In this manner, the query cleanser and pattern generator 610 may remove all the extra-solution words, terms, numbers, and/or the like which are not necessary for the query patterns.

The knowledgebase 608 of the data migration analyzer system may be associated with a user input 607, which may receive user inputs from a user of a client of the data migration analyzer system, from a user of the manager of the data migration analyzer system, and/or the like. In some embodiments, the user generating the user input 607 for the knowledgebase may comprise at least one developer (such as an information technology developer, an application developer, a database developer, and/or the like). In some embodiments, the knowledgebase may comprise pre-tagged data which may be fed into and/or input to the automated query analyzer tool 610 for training the automated query analyzer tool 610.

The query complexity scoring model 612 may receive the metric(s) generated by the automated query analyzer tool 610 and generate the query complexity score using the query complexity scoring model 612. Such a query complexity scoring model 612 may additionally and/or alternatively be pre-trained with developer data (such as the user input 607). In some embodiments, such user input used to train and/or configure the query complexity scoring model 612 may comprise pre-identified keywords, pre-identified functions, pre-identified operators, pre-identified datatypes, pre-identified utilities, pre-identified methods (e.g., execution methods), pre-identified number of joins, and/or the like. Similar to the knowledgebase 608 described herein, the query complexity scoring model 612 may be trained on similar data, which may then be used to generate the query complexity score for each application.

The report generator 614 may be configured to generate the application migration complexity report (i.e., report 616) which may be transmitted as the application migration complexity report interface component to a user device. In some embodiments, and once the report 616 has been generated, the data migration analyzer system may collect the feedback from the user device and input the feedback to knowledgebase for further training of at least the automated query analyzer tool 610 (and in some embodiments, the query complexity scoring model 612).

FIG. 7 illustrates an exemplary GUI comprising a knowledgebase of keywords, functions, and datatypes 700, in accordance with an embodiment of the disclosure. In some embodiments, a system (e.g., similar to one or more of the systems described herein with respect to FIGS. 1A-1C and 2) may perform one or more of the steps to generate knowledgebase 700. For example, a data migration analyzer system (e.g., the system 130 described herein with respect to FIG. 1A-1C) may perform the steps to generate the exemplary knowledgebase 700. For example, a trained machine learning model (e.g., the system 232 described herein with respect to FIG. 2) and/or a computation model may perform some steps to generate knowledgebase 700.

As shown in the exemplary GUI comprising a knowledgebase of keywords, functions, and datatypes 700, the knowledgebase may comprise pre-tagged keywords, functions, datatypes, and/or the like. In some embodiments, such a knowledgebase may be updated, changed, added to, subtracted therefrom, based on the user inputs received by the data migration analyzer system. In some embodiments, the pre-tagging within the knowledgebase 700 may additionally comprise the pre-tagged standard classifications (e.g., ANSI_ FLAG YES) or non-standard classifications (e.g., ANSI_FLAG NO).

FIG. 8 illustrates an exemplary query complexity scoring model 800, in accordance with an embodiment of the disclosure. In some embodiments, a system (e.g., similar to one or more of the systems described herein with respect to FIGS. 1A-1C and 2) may perform one or more of the steps to generate the query complexity scoring model 800. For example, a data migration analyzer system (e.g., the system 130 described herein with respect to FIG. 1A-1C) may perform the steps to generate the query complexity scoring model 800. For example, a trained machine learning model (e.g., the system 232 described herein with respect to FIG. 2) and/or a computation model may perform some steps to generate query complexity scoring model 800.

As shown in the exemplary query complexity scoring model 800, the data migration analyzer system may show a user by configuring a GUI of a user device the query complexity scoring model 800 the query complexity score of each application and how the query complexity score was generated. For instance, the query complexity scoring model 800 may show the number of joins for an application, the number of subqueries within the query log for the application, the presence of specific functions within the query logs which may be present and may be non-standard, and/or the like. Further, and based on the weightage of the query complexity scoring model to each of these factors, the data migration analyzer system may generate the query complexity score for the application(s).

FIG. 9 illustrates an exemplary application migration complexity report 900, in accordance with an embodiment of the disclosure. In some embodiments, a system (e.g., similar to one or more of the systems described herein with respect to FIGS. 1A-1C and 2) may perform one or more of the steps to generate the application migration complexity report 900. For example, a data migration analyzer system (e.g., the system 130 described herein with respect to FIG. 1A-1C) may perform the steps to generate the application migration complexity report 900. For example, a trained machine learning model (e.g., the system 232 described herein with respect to FIG. 2) and/or a computation model may perform some steps to generate the application migration complexity report 900.

As shown in the exemplary application migration complexity report 900 may comprise the query complexity score for each application (e.g., shown in the right-hand column), an application identifier for each application (e.g., shown in the left-hand column), and a ranking of the complexity of the applications based on both of these elements (e.g., the query complexity scores may decrease from top to bottom on the exemplary application migration complexity report 900 or from bottom to top, depending on the user input parameters received by the data migration analyzer system). In some embodiments, the applications (and their associated query complexity scores) may be separated based on the timeline with which the user would like to migrate the applications over to the target network or target database, such as in a "Wave 1," "Wave 2," and/or the like.

FIG. 10 illustrates an exemplary application migration complexity report interface component with interactive capabilities 1000, in accordance with an embodiment of the disclosure. In some embodiments, a system (e.g., similar to one or more of the systems described herein with respect to FIGS. 1A-1C and 2) may perform one or more of the steps to generate the application migration complexity report interface component with interactive capabilities 1000. For example, a data migration analyzer system (e.g., the system 130 described herein with respect to FIG. 1A-1C) may perform the steps to generate the application migration complexity report interface component with interactive capabilities 1000. For example, a trained machine learning model (e.g., the system 232 described herein with respect to FIG. 2) and/or a computation model may perform some steps to generate the application migration complexity report interface component with interactive capabilities 1000.

As shown in the exemplary application migration complexity report interface component with interactive capabilities 1000, the data migration analyzer system may generate an interactive report which is configured on a GUI of a user device and can be interacted with—via user inputs at the user device. In some embodiments, such an application migration complexity report interface component may comprise input elements for the user to interact with via the GUI, such as interactive elements of the scope of the applications to show (e.g., only show a portion of all the applications, and/or the like), an application identifier (e.g., only show a specific application and its data for migration), a platform (e.g., only show applications associated with a particular platform and their data for migration), a user name (e.g., only show the applications associated with a particular user name or user identifier), a Teradata specific identifier (e.g., only show the applications with specific Teradata), an SQL text (e.g., only show the applications with specific SQL text present), an SQL pattern (e.g., only show the applications with a specific SQL pattern present), and/or the like.

In some embodiments, and based on these user inputs, the application migration complexity report interface component with interactive capabilities 1000 may change (e.g., its graphical elements may change, and its data may change), such that only certain applications are present and viewable by the user.

In some embodiments, the application migration complexity report interface component with interactive capabilities 1000 may comprise a menu of SQL patterns to choose from, a menu of SQL text to choose from, and other such user inputs to reconfigure the application migration complexity report interface component without individually having to type each user input into the user device.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for determining data migration using an automated query analyzer tool, the system comprising:
    a memory device with computer-readable program code stored thereon;
    at least one processing device, wherein executing the computer-readable code is configured to cause the at least one processing device to perform the following operations:
    identify at least one input data set associated with at least one application;
    analyze, by an automated query analyzer tool, the at least one input data set;
    classify, by the automated query analyzer tool, data of the at least one data set as at least one of a standard classification or a non-standard classification;
    determine, by the automated query analyzer tool, at least one metric for the data of the at least one data set;
    generate, based on the at least one metric, a query complexity score for the at least one application;
    generate, based on the query complexity score for the at least one application, an application migration complexity report and an application migration complexity report interface component; and
    transmit the application migration complexity report interface component to a user device and configure a graphical user interface of the user device with the application migration complexity report interface component.

2. The system of claim 1, wherein the at least one input data set is identified from at least one of a database, an index, or a query log associated with the at least one application.

3. The system of claim 1, wherein the standard classification comprises an American National Standard Institute (ANSI) classification, and wherein the non-standard classification comprises a non-ANSI classification.

4. The system of claim 1, wherein the data comprises a query, and wherein the at least one metric for the data of the at least one data set comprises a metric for at least one of query join counts, datatype count, function count, or keyword count of the query.

5. The system of claim 1, wherein the computer-readable code is configured to cause the at least one processing device to perform the following operations:
    receive a user input identifying the at least one application for migration to a target database, wherein the user input comprises an identification of at least one input data type for the input data set; and
    trigger, based on receiving the user input identifying the at least one application, the automated query analyzer tool to analyze the at least one input data set.

6. The system of claim 1, wherein the computer-readable code is configured to cause the at least one processing device to perform the following operations:
    generate a knowledgebase comprising training data associated with the at least one application, wherein the training data comprises at least one of a database specific keyword, a function, a datatype, the standard classification, or the non-standard classification;
    apply the training data to the automated query analyzer tool; and
    train, based on applying the training data, the automated query analyzer tool.

7. The system of claim 6, wherein the training data comprises at least one user input.

8. The system of claim 1, wherein the query complexity score is generated by a query complexity scoring model, and wherein the query complexity scoring model is specific for a database identifier of the at least one application.

9. The system of claim 1, wherein the application migration complexity report is interactive.

10. The system of claim 1, wherein the application migration complexity report comprises a ranked list of the at least one application based on the query complexity score.

11. A computer program product for determining data migration using an automated query analyzer tool, wherein the computer program product comprises at least one non-transitory computer-readable medium having computer-readable program code portions embodied therein, the computer-readable program code portions which when executed by a processing device are configured to cause the processor to perform the following operations:
    identify at least one input data set associated with at least one application;
    analyze, by an automated query analyzer tool, the at least one input data set;
    classify, by the automated query analyzer tool, data of the at least one data set as at least one of a standard classification or a non-standard classification;
    determine, by the automated query analyzer tool, at least one metric for the data of the at least one data set;
    generate, based on the at least one metric, a query complexity score for the at least one application;
    generate, based on the query complexity score for the at least one application, an application migration complexity report and an application migration complexity report interface component; and
    transmit the application migration complexity report interface component to a user device and configure a graphical user interface of the user device with the application migration complexity report interface component.

12. The computer program product of claim 11, wherein the data comprises a query, and wherein the at least one metric for the data of the at least one data set comprises a metric for at least one of query join counts, datatype count, function count, or keyword count of the query.

13. The computer program product of claim 11, wherein the processing device is configured to cause the processor to perform the following operations:
    receive a user input identifying the at least one application for migration to a target database, wherein the user input comprises an identification of at least one input data type for the input data set; and
    trigger, based on receiving the user input identifying the at least one application, the automated query analyzer tool to analyze the at least one input data set.

14. The computer program product of claim 11, wherein the processing device is configured to cause the processor to perform the following operations:
    generate a knowledgebase comprising training data associated with the at least one application, wherein the training data comprises at least one of a database specific keyword, a function, a datatype, the standard classification, or the non-standard classification;

apply the training data to the automated query analyzer tool; and train, based on applying the training data, the automated query analyzer tool.

15. The computer program product of claim 11, wherein the query complexity score is generated by a query complexity scoring model, and wherein the query complexity scoring model is specific for a database identifier of the at least one application.

16. A computer implemented method for determining data migration using an automated query analyzer tool, the computer implemented method comprising:

identifying at least one input data set associated with at least one application;

analyzing, by an automated query analyzer tool, the at least one input data set;

classifying, by the automated query analyzer tool, data of the at least one data set as at least one of a standard classification or a non-standard classification;

determining, by the automated query analyzer tool, at least one metric for the data of the at least one data set;

generating, based on the at least one metric, a query complexity score for the at least one application;

generating, based on the query complexity score for the at least one application, an application migration complexity report and an application migration complexity report interface component; and transmitting the application migration complexity report interface component to a user device and configure a graphical user interface of the user device with the application migration complexity report interface component.

17. The computer implemented method of claim 16, wherein the data comprises a query, and wherein the at least one metric for the data of the at least one data set comprises a metric for at least one of query join counts, datatype count, function count, or keyword count of the query.

18. The computer implemented method of claim 16, the computer implemented method further comprising:

receiving a user input identifying the at least one application for migration to a target database, wherein the user input comprises an identification of at least one input data type for the input data set; and triggering, based on receiving the user input identifying the at least one application, the automated query analyzer tool to analyze the at least one input data set.

19. The computer implemented method of claim 16, the computer implemented method further comprising:

generating a knowledgebase comprising training data associated with the at least one application, wherein the training data comprises at least one of a database specific keyword, a function, a datatype, the standard classification, or the non-standard classification;

applying the training data to the automated query analyzer tool; and training, based on applying the training data, the automated query analyzer tool.

20. The computer implemented method of claim 16, wherein the query complexity score is generated by a query complexity scoring model, and wherein the query complexity scoring model is specific for a database identifier of the at least one application.

\* \* \* \* \*